United States Patent
Tix et al.

(10) Patent No.: US 10,261,525 B2
(45) Date of Patent: Apr. 16, 2019

(54) PLURAL COMPONENT RATIO MONITORING AND CONTROL

(71) Applicant: Graco Minnesota Inc., Minneapolis, MN (US)

(72) Inventors: Joseph E. Tix, Hastings, MN (US); Martin P. McCormick, Forest Lake, MN (US); Christopher M. Lange, Shoreview, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/469,002

(22) Filed: Mar. 24, 2017

(65) Prior Publication Data
US 2017/0277205 A1    Sep. 28, 2017

Related U.S. Application Data

(60) Provisional application No. 62/313,932, filed on Mar. 28, 2016.

(51) Int. Cl.
| G05D 11/02 | (2006.01) |
| G05D 11/13 | (2006.01) |
| G05D 7/06  | (2006.01) |

(52) U.S. Cl.
CPC ......... G05D 11/132 (2013.01); G05D 7/0635 (2013.01)

(58) Field of Classification Search
CPC .. G05D 11/139; G05D 7/0658; G05D 7/0676; B05B 12/1436; C23C 16/4482; B67D 7/0266; B67D 7/0238; B01F 15/042

USPC ............ 137/505.12, 613; 222/64–66; 261/DIG. 7

See application file for complete search history.

(56) References Cited

U.S. PATENT DOCUMENTS

| 3,802,605 A |   4/1974 | Standlick |
| 3,817,658 A |   6/1974 | Murase |
| 3,921,901 A | 11/1975 | Woodman |
| 4,234,007 A | 11/1980 | Titone et al. |
| 4,440,314 A |   4/1984 | Vetter et al. |
| 4,876,653 A | 10/1989 | McSpadden et al. |
| 4,898,205 A * | 2/1990 | Ross ............ F17C 13/04 137/505.12 |
| 5,125,533 A |   6/1992 | Gayer et al. |
| 5,284,174 A |   2/1994 | Norman |
| 5,425,968 A |   6/1995 | Larson |

(Continued)

*Primary Examiner* — John Fox
(74) *Attorney, Agent, or Firm* — Kinney & Lange, P.A.

(57) ABSTRACT

A plural component dispensing system includes at least one compressed gas pneumatically connected to supply pressurized gas to each of a first pressure vessel that discharges a first fluid component and a second pressure vessel that discharges a second fluid component. Each of the first fluid component and the second fluid component is supplied from the respective pressure vessel through individual flow meters to a device. A first pressure regulator is pneumatically connected between the first pressure vessel and the at least one compressed gas source to regulate pressure of the first pressure vessel. A controller receives sensed first and second volumetric flow rates from the individual flow meters and controls the first pressure regulator based on the sensed volumetric flow rates to produce a target ratio of the first fluid component and the second fluid component at the device.

18 Claims, 3 Drawing Sheets

(56) References Cited

U.S. PATENT DOCUMENTS

| | | | |
|---|---|---|---|
| 5,490,726 A | 2/1996 | Davis et al. | |
| 5,823,219 A | 10/1998 | Purvis et al. | |
| 6,543,469 B2 | 4/2003 | Lewit et al. | |
| 6,796,702 B2 * | 9/2004 | Wire | B01F 3/088 366/152.2 |
| 6,935,374 B2 * | 8/2005 | Yamamoto | G05D 16/2086 137/627.5 |
| 7,114,517 B2 * | 10/2006 | Sund | G01F 1/8413 137/487.5 |
| 7,325,397 B2 * | 2/2008 | Lee | B25C 1/04 137/505.11 |
| 8,322,571 B2 * | 12/2012 | Hovinen | B01J 4/02 141/21 |
| 8,561,921 B1 | 10/2013 | Showman et al. | |
| 8,849,466 B2 | 9/2014 | Ding | |
| 9,242,267 B2 | 1/2016 | O'Leary et al. | |
| 9,815,682 B2 * | 11/2017 | Miller | B67D 7/0266 |
| 2007/0204912 A1 * | 9/2007 | Hanada | G05D 11/132 137/487.5 |

\* cited by examiner

PLURAL COMPONENT RATIO MONITORING AND CONTROL

CROSS-REFERENCE TO RELATED APPLICATION(S)

This application claims priority to U.S. Provisional Application No. 62/313,932, filed on Mar. 28, 2016, and entitled "PLURAL COMPONENT RATIO MONITORING AND CONTROL," the disclosure of which is hereby incorporated by reference in its entirety.

BACKGROUND

This disclosure relates generally to plural component dispensing systems, and more particularly to monitoring and control of the plural material components to achieve a target mixing ratio.

Multiple component applicators often receive separate inert fluid components that are mixed and dispensed as an activated compound. For example, multiple component applicators are used to dispense epoxies and polyurethanes that solidify after mixing of a resin component and an activating material, which are individually inert. To achieve the desired properties of the resultant material, the component materials are mixed at a predetermined ratio. To ensure that the correct ratio is provided to the applicator, a user typically calibrates the system prior to use by directing samples of each component material to, e.g., separate disposable containers and comparing the weights of the multiple samples to determine a ratio. If the ratio is incorrect, pressures in material tanks discharging the separate components are adjusted and additional samples are taken until the desired ratio is achieved. Such manual measurement of the material samples with subsequent manual pressure adjustments is often inaccurate, wastes component materials, creates chemical waste, and is time-consuming. Moreover, because the viscosity of the individual component materials are often temperature-dependent, manual calibration techniques can give rise to inaccurate resulting ratios as temperature of the component materials changes between calibrations.

SUMMARY

In one example, a system includes at least one compressed gas source, a first pressure vessel, a second pressure vessel, a first pressure regulator, a first flow meter, a second flow meter, a receiving device, and a controller. The first pressure vessel is pneumatically connected to the at least one compressed gas source and is configured to discharge a first fluid component based on a first pressure of the first pressure vessel. The second pressure vessel is pneumatically connected to the at least one compressed gas source and is configured to discharge a second fluid component based on a second pressure of the second pressure vessel. The first pressure regulator is pneumatically connected between the first pressure vessel and the at least one compressed gas source to regulate the first pressure of the first pressure vessel. The first flow meter is configured to sense a first volumetric flow rate of the first fluid component discharged from the first pressure vessel. The second flow meter is configured to sense a second volumetric flow rate of the second fluid component discharged from the second pressure vessel. The receiving device receives the first fluid component and the second fluid component. The controller is connected to receive the sensed first volumetric flow rate from the first flow meter and the sensed second volumetric flow rate from the second flow meter. The controller is configured to control the first pressure regulator based on the sensed first volumetric flow rate and the sensed second volumetric flow rate to produce a target ratio of the first fluid component and the second fluid component at the receiving device.

In another example, a system includes at least one compressed gas source, a first pressure vessel, a second pressure vessel, a first pressure regulator, a first flow meter, a second flow meter, a mixing device, and a controller. The first pressure vessel is pneumatically connected to the at least one compressed gas source and is configured to discharge a first fluid component based on a first pressure of the first pressure vessel. The second pressure vessel is pneumatically connected to the at least one compressed gas source and is configured to discharge a second fluid component based on a second pressure of the second pressure vessel. The first pressure regulator is pneumatically connected between the first pressure vessel and the at least one compressed gas source to regulate the first pressure of the first pressure vessel. The first flow meter is configured to sense a first volumetric flow rate of the first fluid component discharged from the first pressure vessel. The second flow meter is configured to sense a second volumetric flow rate of the second fluid component discharged from the second pressure vessel. The mixing device is connected to receive the first fluid component and the second fluid component and deliver mixed fluid based on a target mix ratio of the first fluid component and the second fluid component. The controller is connected to receive the sensed first volumetric flow rate from the first flow meter and the sensed second volumetric flow rate from the second flow meter. The controller is configured to control the first pressure regulator based on the sensed first volumetric flow rate and the sensed second volumetric flow rate so that the first volumetric flow rate is scaled to the sensed second volumetric flow rate to produce the target mix ratio.

In another example, a method includes measuring, by a first flow meter, a first volumetric flow rate of a first fluid component discharged from a first pressure vessel; and measuring, by a second flow meter, a second volumetric flow rate of a second fluid component discharged from a second pressure vessel. The method further includes receiving, at a controller device, an indication of the first measured volumetric flow rate from the first flow meter and an indication of the second measured volumetric flow rate from the second flow meter. The method further includes controlling, by the controller device, a first pressure regulator pneumatically connected to the first pressure vessel to regulate a pressure of the first pressure vessel to produce a target ratio of the first fluid component and the second fluid component at a device.

DETAILED DESCRIPTION

As described herein, a plural component dispensing system automatically regulates pressure within one or more of a plurality of pressure vessels based on measured volumetric flow rates of each fluid component discharged from the pressure vessels to achieve a target ratio of the multiple fluid components. Accordingly, a dispensing system implementing techniques of this disclosure helps to ensure that the individual components are applied at the target ratio without the need for costly and time-consuming manual calibrations that may become inaccurate as temperature of the component materials or other system parameters change.

Figure 1:
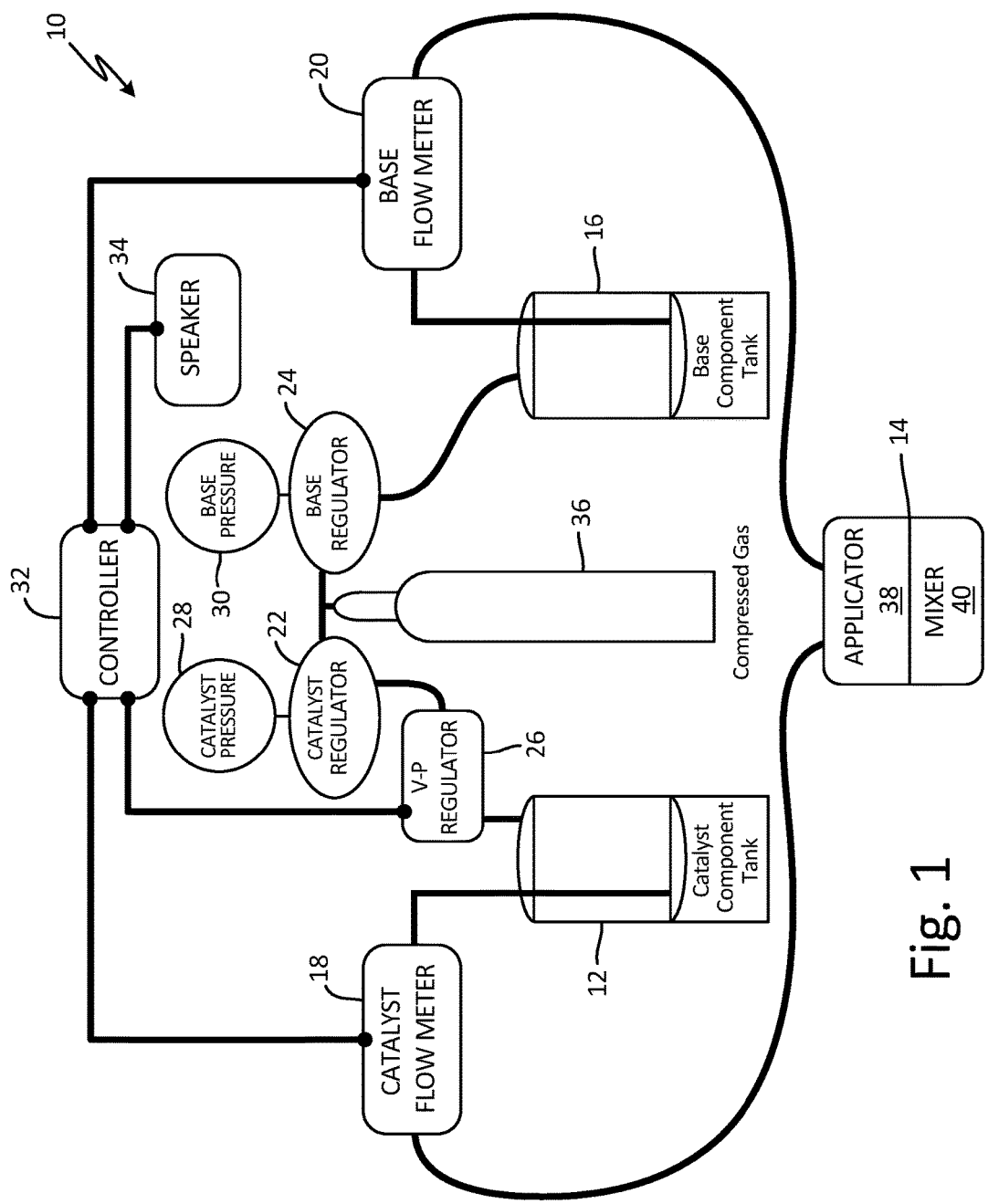
FIG. 1 is a schematic block diagram of a two component fluid dispensing system that controls pressure of a first pressure vessel based on sensed volumetric flow of each of the two components to achieve a target ratio of the two components.

FIG. 1 is a schematic block diagram of fluid dispensing system 10 that controls pressure of catalyst pressure vessel 12 based on sensed volumetric flows to achieve a target ratio of a catalyst fluid component and a base fluid component at dispensing device 14. As illustrated in FIG. 1, fluid dispensing system 10 further includes base pressure vessel 16, catalyst flow meter 18, base flow meter 20, catalyst pressure regulator 22, base pressure regulator 24, electronic pressure control regulator 26, catalyst pressure indicator 28, base pressure indicator 30, controller 32, speaker 34, and compressed gas source 36. Dispensing device 14 includes applicator 38 and mixer 40.

Compressed gas source 36 stores pressurized gas, such as Nitrogen gas, at a first pressure, such as a pressure of 2000 pounds per square inch (psi). Compressed gas source 36 is pneumatically connected to catalyst pressure vessel 12 to supply compressed gas to catalyst pressure vessel 12 via catalyst pressure regulator 22 and electronic pressure control regulator 26. That is, compressed gas flows from compressed gas source 36 through catalyst pressure regulator 22 and electronic pressure control regulator 26 to catalyst pressure vessel 12. Compressed gas source 36 is also pneumatically connected to base pressure vessel 16 to supply compressed gas to base pressure vessel 16 via base pressure regulator 24, such that compressed gas flows from compressed gas source 36 through based pressure regulator 24 to base pressure vessel 16. While illustrated and described in the example of FIG. 1 as including a single compressed gas source, in other examples, fluid dispensing system 10 can include multiple (e.g., two or more) compressed gas sources. For instance, in some examples, fluid dispensing system 10 can include a first compressed gas source pneumatically connected to catalyst pressure vessel 12 and a second compressed gas source pneumatically connected to base pressure vessel 16.

Each of catalyst pressure regulator 22 and base pressure regulator 24 are pressure regulating valves that regulate downstream pneumatic pressure via, e.g., a variable orifice. For instance, each of catalyst pressure regulator 22 and base pressure regulator 24 can be variable orifice regulator valves that are manually set (e.g., via knobs or other manual actuation) to reduce pneumatic pressure between an upstream inlet (e.g., pneumatically connected to compressed gas source 36) and a downstream outlet. As illustrated in FIG. 1, the downstream outlet of catalyst pressure regulator 22 is pneumatically connected to an upstream inlet of electronic pressure control regulator 26. As such, catalyst pressure regulator 22 regulates pressure of the compressed gas delivered to the upstream inlet of electronic pressure control regulator 26, such as to decrease a pressure of the compressed gas from the first pressure supplied by compressed gas source 36 (e.g., 2000 psi) to a second, lower pressure (e.g., 200 psi) delivered to electronic pressure control regulator 26. In the example of FIG. 1, the downstream outlet of base pressure regulator 24 is pneumatically connected to a pneumatic inlet of base pressure vessel 16 to regulate pressure within base pressure vessel 16. In other examples, the downstream outlet of base pressure regulator 24 can be pneumatically connected to a second electronic pressure control regulator, as is further described below. In yet other examples, each of catalyst pressure regulator 22 and base pressure regulator 24 can be electronic pressure control regulators that are electrically controlled (e.g., via controller 32) to regulate pressure within catalyst pressure vessel 12 and base pressure vessel 16, respectively.

Catalyst pressure indicator 28 and base pressure indicator 30 are pressure gauges or other type of pressure indicator that measure and display (e.g., via an analog dial or digital indication) pneumatic pressure at the downstream outlet of catalyst pressure regulator 22 and base pressure regulator 24, respectively. Accordingly, catalyst pressure indicator 28 and base pressure indicator 30 can enable manual adjustment of catalyst pressure regulator 22 and base pressure regulator 24 to achieve a target downstream pressure, such as a pressure of 200 psi downstream of catalyst pressure regulator 22 and a pressure of 150 psi downstream of base pressure regulator 24. In some examples, each of catalyst pressure regulator 22 and base pressure regulator 24 are variable pressure regulators (e.g., variable orifice pressure regulators) that enable regulation of pressure between the upstream inlet and the downstream outlet of each respective pressure regulator from 0 psi to 200 psi via manual actuation (e.g., user actuation) of the regulator and indication of the regulated pressures at catalyst pressure indicator 28 and base pressure indicator 30.

As illustrated in FIG. 1, electronic pressure control regulator 26 is pneumatically connected between a downstream outlet of catalyst pressure regulator 22 and a pneumatic inlet of catalyst pressure vessel 12. Electronic pressure control regulator 26 can be a voltage-to-pressure (V-P) regulator, a current-to-pressure (I-P) regulator, or other type of electronic pressure control regulator that controls a pneumatic pressure at a downstream outlet of the electronic pressure control regulator based on a received input control signal. For example, as illustrated in FIG. 1, electronic control regulator 26 (i.e., a voltage-to-pressure regulator in this example) is electrically coupled with controller 32 to receive an input control signal, such as a voltage ranging between 0 and 24 Volts. Electronic pressure control regulator 26 regulates the pneumatic pressure at the downstream outlet of electronic pressure control regulator 26 (i.e., pneumatically connected to a pneumatic inlet of catalyst pressure vessel 12) based on an input control signal (e.g., an input voltage) received from controller 32 to regulate pressure within catalyst pressure vessel 12 over a range of, e.g., 100 psi to 200 psi, as is further described below.

Catalyst pressure vessel 12 stores a catalyst fluid component under pressure via compressed gas received from compressed gas source 36 and regulated by catalyst pressure regulator 22 and electronic pressure control regulator 26. Base pressure vessel 16 stores a base fluid component under pressure via compressed gas received from compressed gas source 36 and regulated by base pressure regulator 24. The catalyst fluid component and base fluid component are separately-inert components in a two-component spray application in which the catalyst fluid component and base fluid component chemically react when mixed to form an activated material, such as quick-cure polyurethane foam.

As illustrated in FIG. 1, each of catalyst pressure vessel 12 and base pressure vessel 16 is hydraulically connected to dispensing device 14. Catalyst flow meter 18 is located between catalyst pressure vessel 12 and dispensing device 14 to measure a volumetric flow rate of catalyst fluid component discharged from catalyst pressure vessel 12 to dispensing device 14. That is, catalyst fluid component is discharged from catalyst pressure vessel 12 at a rate that is proportional to a pressure within catalyst pressure vessel 12. The catalyst fluid component discharged from catalyst pressure vessel 12 flows through catalyst flow meter 18 to dispensing device 14 via the hydraulic connection. Catalyst flow meter 18 measures the volumetric flow rate of the discharged catalyst fluid component as it passes through catalyst flow meter 18. Base flow meter 20, as illustrated in FIG. 1, is located between base pressure vessel 16 and dispensing device 14 to measure a volumetric flow rate of base fluid component discharged from based pressure vessel 16. Base fluid component is discharged from base pressure vessel 16 at a rate that is proportional to a pressure within based pressure vessel 16. The base fluid component discharged from base pressure vessel 16 flows through base flow meter 20 to dispensing device 14 via the hydraulic connection. Base flow meter 20 measures the volumetric flow rate of the discharged base fluid component as it passes through base flow meter 20.

Each of catalyst flow meter 18 and base flow meter 20 can be a positive displacement meter (e.g., gear meter), mass flow meter, or other type of flow meter. Catalyst flow meter 18 and base flow meter 20 can be the same or different type of flow meter. In general, each of catalyst flow meter 18 and base flow meter 20 can be any type of flow meter configured to measure a volumetric flow rate of fluid component passing through the respective flow meter and transmit an indication of the sensed volumetric flow rate to controller 32. That is, as illustrated in FIG. 1, each of catalyst flow meter 18 and base flow meter 20 are electrically and/or communicatively coupled with controller 32 to transmit an indication of a sensed volumetric flow rate to controller 32 during operation. Controller 32 utilizes the received volumetric flow rates to control electronic pressure control regulator 26 to regulate a pressure within catalyst pressure vessel 12 to achieve a target ratio of the catalyst fluid component and base fluid component delivered to dispensing device 14, as is further described below.

Dispensing device 14, as illustrated in FIG. 1, includes applicator 38 and mixer 40. Dispensing device 14 can be, e.g., a dispensing gun configured to receive the individually-inert catalyst and base fluid components and deliver the activated component after mixing of the catalyst and base fluid components at mixer 40. That is, applicator 38 receives each of the catalyst fluid component and base fluid component and provides the two individual components to mixer 40, which mixes the two components during delivery. Accordingly, mixing of the base fluid component and the catalyst fluid component is delayed until delivery of the components through mixer 40 and release of the activated material from dispensing device 14.

Controller 32 includes one or more processors and computer-readable memory encoded with instructions that, when executed by the one or more processors, cause controller 32 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of controller 32 can be configured to store information within controller 32 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller 32 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

Controller 32, in some examples, includes user interface components including one or more input devices (e.g., a keyboard, buttons, mouse, microphone, or other input devices) configured to receive input from a user and one or more output devices (e.g., a display device, indicator lights, or other output devices) configured to present information to a user. In some examples, controller 32 includes a touch-sensitive display configured to receive user input in the form of gestures (e.g., touch gestures, swipe gestures, pinch gestures, or other gestures) and to display information to the user.

As illustrated in FIG. 1, controller 32 is electrically and/or communicatively coupled with each of catalyst flow meter 18 and base flow meter 20 to receive information indicative of a sensed volumetric flow rate measured by each of catalyst flow meter 18 and base flow meter 20. For instance, in examples where catalyst flow meter 18 and base flow meter 20 are positive displacement gear meters, controller 32 can receive an indication of a number of gear revolutions of each of catalyst flow meter 18 and base flow meter 20. In such examples, controller 32 can determine a volumetric flow rate through each respective flow meter based on a defined volumetric flow per revolution (or partial revolution) of the respective gears. In other examples, one or more of catalyst flow meter 18 and base flow meter 20 can determine a volumetric flow rate through the respective flow meter and can transmit and indication of the measured volumetric flow rate to controller 32.

Controller 32, as illustrated in FIG. 1, is electrically and/or communicatively coupled with electronic pressure control regulator 26. Controller 32 transmits control commands in the form of voltage control commands, electrical current control commands, or other control commands to cause electronic pressure control regulator 26 to regulate pressure within catalyst pressure vessel 12 to produce a target ratio (i.e., a target mix ratio) of catalyst fluid component and base fluid component delivered to dispensing device 14. For example, controller 32 can store the target ratio and/or receive the target ratio via a user interface of controller 32 (e.g., via user input). Controller 32 determines a ratio of catalyst fluid component to base fluid component delivered to dispensing device 14 as the ratio of the volumetric flow rate sensed by catalyst flow meter 18 to the volumetric flow rate sensed by base flow meter 20. Based on the determined ratio of the volumetric flow rates, controller 32 controls electronic pressure control regulator 26 to regulate pressure within catalyst pressure vessel 12 to produce the target mix ratio. For example, controller 32 can implement a proportional-integral-derivative or other control algorithm to cause electronic pressure control regulator 26 to increase a pressure within catalyst pressure vessel 12 (and hence increase the flow rate of catalyst fluid component discharged from catalyst pressure vessel 12) in response to determining that the ratio of the sensed volumetric flow received from catalyst flow meter 18 to the sensed volumetric flow received from base flow meter 20 is less than the target ratio of the catalyst fluid component to the base fluid component. Controller 32 can cause electronic pressure control regulator 26 to decrease a pressure within catalyst pressure vessel 12 (and hence decrease the flow rate of catalyst fluid component discharged from catalyst pressure vessel 12) in response to determining that the ratio of the sensed volumetric flow received from catalyst flow meter 18 to the sensed volumetric flow received from base flow meter 20 is greater than the target ratio of the catalyst fluid component to the base fluid component.

As such, controller 32 can automatically control electronic pressure control regulator 26 to regulate pressure within catalyst pressure vessel 12 to produce the target mix ratio of catalyst fluid component to base fluid component delivered to dispensing device 14. Controller 32 can therefore help to ensure that the target mix ratio is delivered to dispensing device 14 even as temperature of the fluid components or other system parameters changes.

Accordingly, controller 32 implementing techniques of this disclosure can help to minimize waste and time related to manual calibration operations while helping to ensure accuracy of the mix ratio delivered to dispensing device 14.

As illustrated in FIG. 1, controller 32 is further connected to speaker device 34. Controller 32 can cause speaker device 34 to output audio alerts (e.g., voice alerts, sounds, or other alerts). For instance, controller 32 can cause speaker device 34 to output an audio alert in response to determining that the ratio of the sensed volumetric flow received from catalyst flow meter 18 to the sensed volumetric flow received from base flow meter 20 differs from the target mix ratio. In some examples, controller 32 causes speaker device 34 to output the audio alert in response to determining that the ratio of the sensed volumetric flow received from catalyst flow meter 18 to the sensed volumetric flow received from base flow meter 20 differs from the target mix ratio by a threshold amount and/or for a threshold time duration. Speaker device 34 can be remote from or integral to controller 32. For instance, in some examples, speaker device 34 is remote from controller 32, such that speaker device 34 can be collocated with dispensing device 14 and remote from controller 32. That is, in some examples, dispensing device 14 is hydraulically connected to each of catalyst pressure vessel 12 and base pressure vessel 16 via hydraulic connections that enable dispensing device 14 to be operated at a location that is remote from the pressure vessels, such as tens of feet, hundreds of feet, or other distances from catalyst pressure vessel 12 and base pressure vessel 16. In such examples, controller 32 can be collocated with catalyst pressure vessel 12 and base pressure vessel 16, and speaker device 34 can be collocated with dispensing device 14, such as at a work site that is remote from the pressure vessels where dispensing device 14 is utilized to apply the activated compound. As such, speaker device 34 can provide one or more audio alerts to a user who may be hundreds of feet removed from controller 32 and the remainder of fluid dispensing system 10 where a visual or audio alert from controller 32 may not be easily observed by the user.

In some examples, controller 32 can display and/or cause speaker device 34 to output an audio alert in response to determining that a remaining volume of catalyst fluid component within catalyst pressure vessel 12 and/or a remaining volume of base fluid component within base pressure vessel 16 is below a threshold volume. For instance, controller 32 can determine a remaining volume of catalyst fluid component within catalyst pressure vessel 12 based on an initial volume of the catalyst fluid component (e.g., a default initial volume or an initial volume received via user input at controller 32) and the volumetric flow rate sensed by catalyst flow meter 18. For instance, controller 32 can iteratively subtract a volume of catalyst fluid component from the initial volume of the catalyst fluid component based on the sensed volumetric flow rate received from catalyst flow meter 18 over time. Controller 32 can similarly determine a remaining volume of base fluid component within base pressure vessel 16 based on an initial volume of the base fluid component (e.g., a default initial volume or an initial volume received via user input at controller 32) and the volumetric flow rate sensed by based flow meter 20 (e.g., via subtraction). Controller 32 can store and/or display the remaining and/or utilized volume of each of the catalyst fluid component and the base fluid component, such as for determining an amount of each component utilized for a particular job or during a particular work day. In this way, controller 32 can facilitate inventory management operations for reordering the consumable fluid components and/or billing procedures for, e.g., charging a customer or client for a particular amount of utilized fluid components.

As such, fluid dispensing system 10 implementing techniques described herein can enable accurate and automatic regulation of pressure within catalyst pressure vessel 12 to produce a target mix ratio of catalyst fluid component and base fluid component delivered to dispensing device 14. Such automatic regulation can help to ensure that the target mix ratio of the catalyst and base fluid components is delivered to dispensing device 14 even as temperature or other flow-related parameters of the fluid components changes, thereby helping to ensure the quality of the activated compound delivered by dispensing device 14. The techniques can reduce the need for manual calibrations, thereby reducing the corresponding waste material and time relating to such manual calibration operations. Separation of the individually-inert catalyst fluid component and base fluid component until mixing at dispensing device 14 can help to prevent clogging that may otherwise occur were the catalyst fluid component and base fluid component mixed to form the activated compound upstream of dispensing device 14. Moreover, regulation of the ratio of catalyst fluid component to base fluid component delivered to dispensing device 14 utilizing a single electronic pressure control regulator reduces the cost, complexity, and maintenance requirements that may be associated with systems utilizing multiple (e.g., two) electronic pressure control regulators. As such, fluid dispensing system 10 implementing techniques of this disclosure can increase accuracy of operation of the system to deliver a target mix ratio of catalyst fluid component to base fluid component while decreasing costs associated with manual calibration techniques (e.g., wasted material and time) and maintenance of the system.

Figure 2:
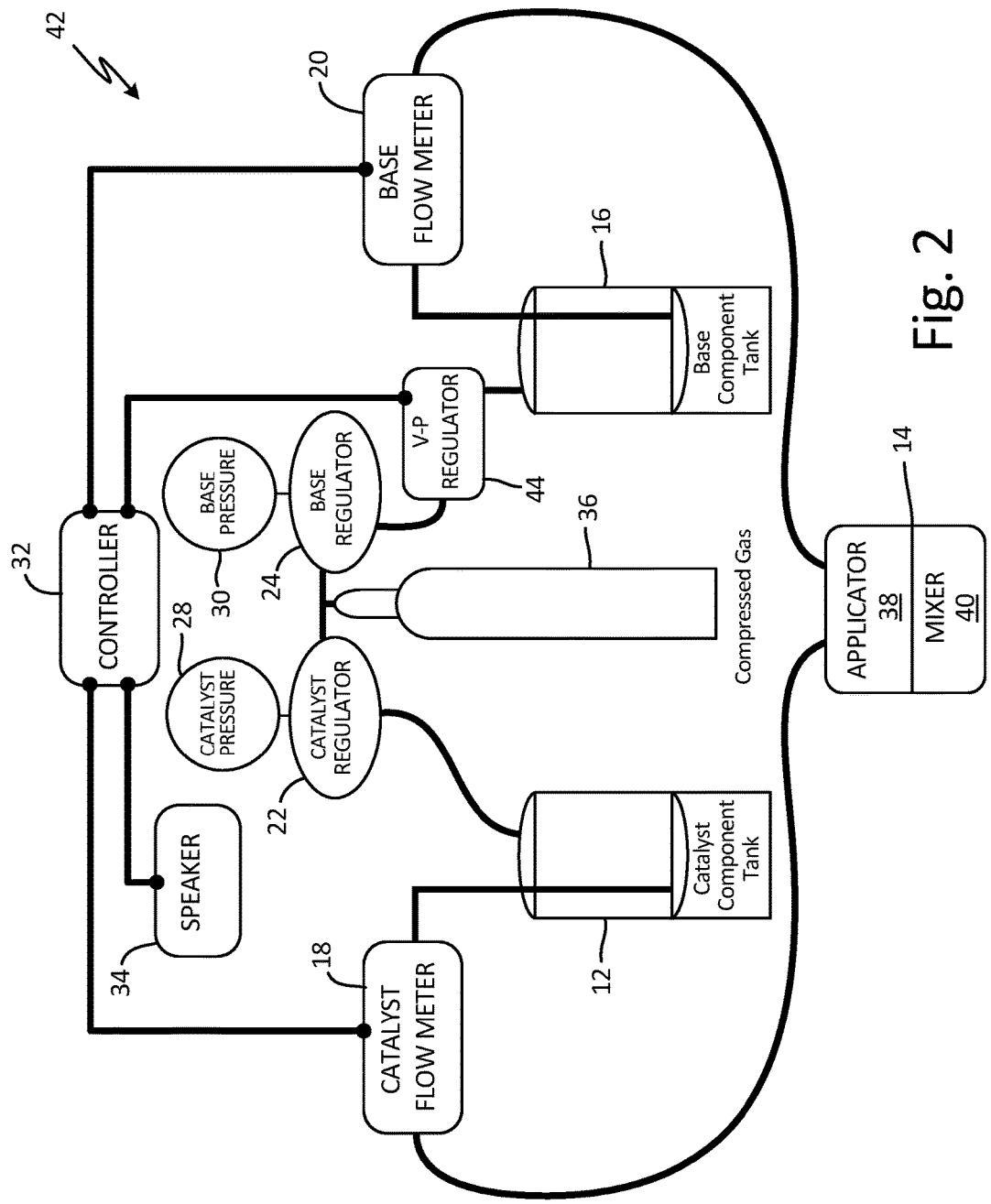
FIG. 2 is a schematic block diagram of a two component fluid dispensing system that controls pressure of a second pressure vessel based on sensed volumetric flow of each of the two components to achieve a target ratio of the two components.

FIG. 2 is a schematic block diagram of fluid dispensing system 42 that controls pressure of base pressure vessel 16 based on sensed volumetric flows to achieve a target ratio of a catalyst fluid component and a base fluid component at dispensing device 14. The example of FIG. 2 is similar to the example of FIG. 1, and same reference numbers are utilized to illustrate same parts. In the example of FIG. 2, rather than utilize electronic pressure control regulator 26 (FIG. 1) to regulate pressure within catalyst pressure vessel 12 to produce the target ratio of catalyst and base fluid components as was described above with respect to FIG. 1, fluid dispensing system 42 utilizes electronic pressure control regulator 44 to regulate pressure within base pressure vessel 16 to produce the target mix ratio.

Electronic pressure control regulator 44 can be substantially similar to electronic pressure control regulator 26 (FIG. 1). That is, electronic pressure control regulator 44 can be a voltage-to-pressure regulator, a current-to-pressure regulator, or other type of electronic pressure control regulator that controls a pneumatic pressure at a downstream outlet of the electronic pressure control regulator based on an input control signal received from controller 32.

In operation, controller 32 determines a ratio of catalyst fluid component to base fluid component delivered to dispensing device 14 as the ratio of the volumetric flow rate sensed by catalyst flow meter 18 to the volumetric flow rate sensed by base flow meter 20. Based on the determined ratio of the volumetric flow rates, controller 32 transmits control commands to electronic pressure control regulator 44 in the form of voltage control commands, electrical current control commands, or other control commands to cause electronic pressure control regulator 44 to regulate pressure within base component vessel 16 to produce the target ratio of catalyst fluid component and base fluid component delivered to dispensing device 14. For example, controller 32 can implement a proportional-integral-derivative or other control algorithm to cause electronic pressure control regulator 44 to decrease a pressure within base pressure vessel 16 (and hence decrease the flow rate of base fluid component discharged from base pressure vessel 16) in response to determining that the ratio of the sensed volumetric flow received from catalyst flow meter 18 to the sensed volumetric flow received from base flow meter 20 is less than the target ratio of the catalyst fluid component to the base fluid component. Controller 32 can cause electronic pressure control regulator 44 to increase a pressure within base pressure vessel 16 (and hence increase the flow rate of base fluid component discharged from base pressure vessel 16) in response to determining that the ratio of the sensed volumetric flow received from catalyst flow meter 18 to the sensed volumetric flow received from base flow meter 20 is greater than the target ratio of the catalyst fluid component to the base fluid component.

Accordingly, controller 32 can automatically control electronic pressure control regulator 44 to regulate pressure within base pressure vessel 16 to produce the target mix ratio of catalyst fluid component to base fluid component delivered to dispensing device 14. As such, controller 32 can help to ensure that the target mix ratio is delivered to dispensing device 14 even as temperature of the fluid components or other system parameters changes.

Figure 3:
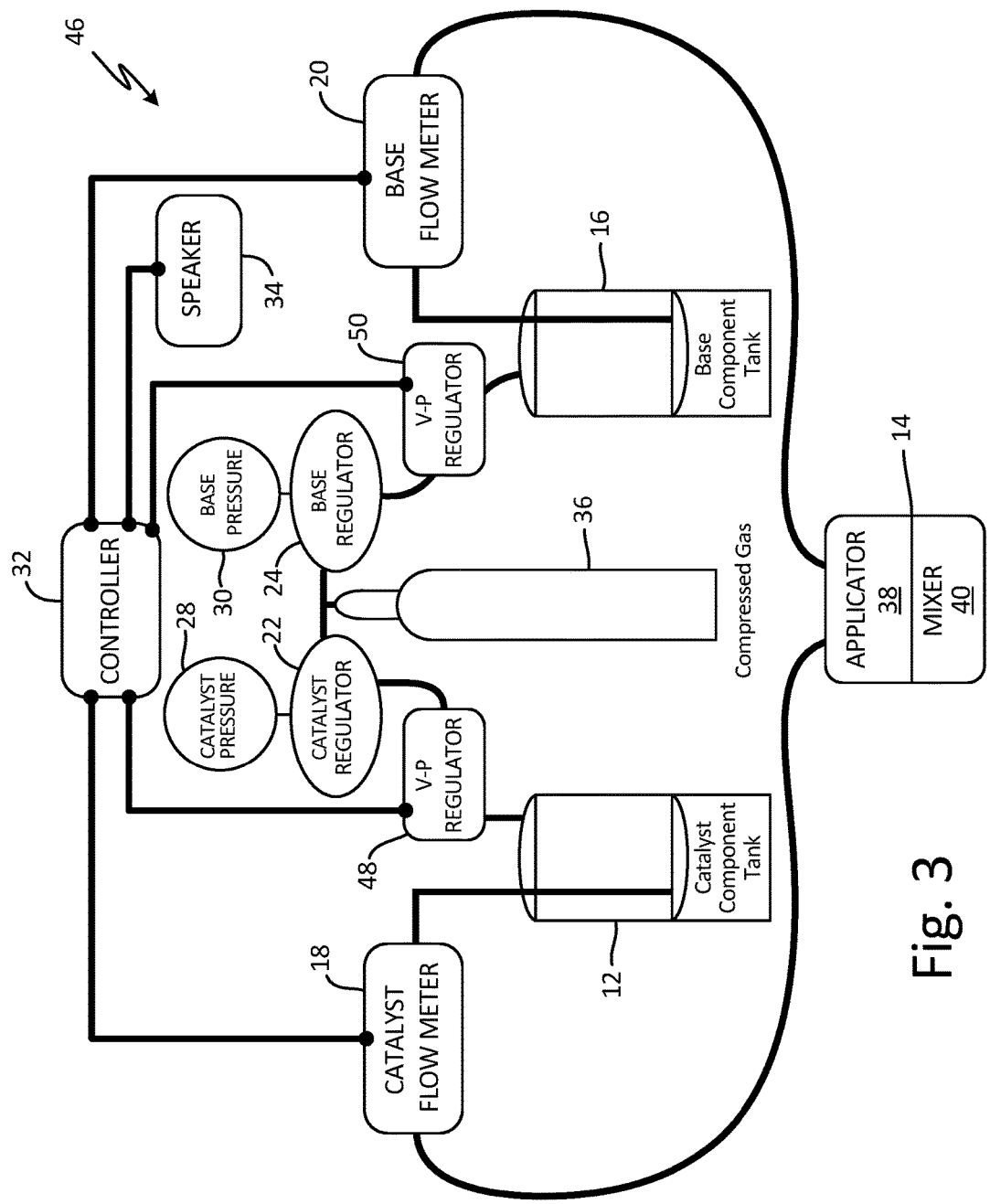
FIG. 3 is a schematic block diagram of a two component fluid dispensing system that controls pressure of each of the first pressure vessel and the second pressure vessel based on sensed volumetric flow of each of the two components to achieve a target ratio of the two components.

FIG. 3 is a schematic block diagram of fluid dispensing system 46 that controls pressure of both catalyst pressure vessel 12 and base pressure vessel 16 based on sensed volumetric flows to achieve a target ratio of a catalyst fluid component and a base fluid component at dispensing device 14. The example of FIG. 3 is similar to the examples of FIGS. 1 and 2 described above, and same reference numbers are utilized to illustrate same parts. In the example of FIG. 3, rather than utilize a single electronic pressure control regulator to regulate pressure within one of catalyst pressure vessel 12 (as described above with respect to FIG. 1) or base pressure vessel 16 (as described above with respect to FIG. 2), fluid dispensing system 46 utilizes both electronic pressure control regulator 48 and electronic pressure control regulator 50 to regulate pressure within each of catalyst pressure vessel 12 and base pressure vessel 16 to produce the target mix ratio.

Electronic pressure control regulators 48 and 50 can be substantially similar to electronic pressure control regulators 26 (FIG. 1) and 44 (FIG. 2). That is, electronic pressure control regulators 48 and 50 can each be one of a voltage-to-pressure regulator, a current-to-pressure regulator, or other type of electronic pressure control regulator that controls a pneumatic pressure at a downstream outlet of the electronic pressure control regulator based on an input control signal received from controller 32.

In operation, controller 32 determines a ratio of catalyst fluid component to base fluid component delivered to dispensing device 14 as the ratio of the volumetric flow rate sensed by catalyst flow meter 18 to the volumetric flow rate sensed by base flow meter 20. Based on the determined ratio of the volumetric flow rates, controller 32 transmits control commands to each of electronic pressure control regulator 48 and electronic pressure control regulator 50 in the form of voltage control commands, electrical current control commands, or other control commands to cause electronic pressure control regulator 48 to regulate pressure within catalyst component vessel 12 and electronic pressure control regulator 50 to regulate pressure within base component vessel 16 to produce the target ratio of catalyst fluid component and base fluid component delivered to dispensing device 14.

For example, in response to determining that the ratio of the sensed volumetric flow received from catalyst flow meter 18 to the sensed volumetric flow received from base flow meter 20 is less than the target ratio of the catalyst fluid component to the base fluid component, controller 32 can cause electronic pressure control regulator 48 to increase a pressure within catalyst pressure vessel 12 (and hence increase the flow rate of catalyst fluid component discharged from catalyst pressure vessel 12) and can cause electronic pressure control regulator 50 to decrease a pressure within base pressure vessel 16 (and hence decrease the flow rate of base fluid component discharged from base pressure vessel 16). In response to determining that the ratio of the sensed volumetric flow received from catalyst flow meter 18 to the sensed volumetric flow received from base flow meter 20 is greater than the target ratio of the catalyst fluid component to the base fluid component, controller 32 can cause electronic pressure control regulator 48 to decrease a pressure within catalyst pressure vessel 12 (and hence decrease the flow rate of catalyst fluid component discharged from catalyst pressure vessel 12) and can cause electronic pressure control regulator 50 to increase a pressure within base pressure vessel 16 (and hence increase the flow rate of base fluid component discharged from base pressure vessel 16).

Accordingly, in some examples, controller 32 can control pressure within each of catalyst pressure vessel 12 and base pressure vessel 16 to produce a target mix ratio of the catalyst and base fluid components delivered to dispensing device 14. The use of both electronic pressure control regulators 48 and 50 can enable fluid dispensing system 46 to produce the target mix ratio (or to correct for off-ratio conditions) within a shorter time duration than systems that utilize a single electronic pressure control regulator to regulate pressure within just one of catalyst pressure vessel 12 and base pressure vessel 16. That is, the simultaneous control of pressures within both catalyst pressure vessel 12 and base pressure vessel 16 can enable fluid dispensing system 46 to achieve a faster response time to produce the target mix ratio than systems utilizing a single electronic pressure control regulator. In addition, in the event that one of electronic pressure control regulators 48 and 50 becomes inoperable or otherwise encounters a fault condition, fluid dispensing system 46 can continue to produce the target mix ratio delivered to dispensing device 14 by controlling the operable one of electronic pressure control regulators 48 and 50. As such, the use of fluid dispensing system 46 that includes two electronic pressure control regulators (i.e., regulators 48 and 50) provides redundant control of the system pressures to produce the target mix ratio, thereby increasing overall system reliability.

According to techniques described herein, a plural component dispensing system can automatically regulate pressure within one or more of a plurality of pressure vessels based on measured volumetric flow rates of each fluid component discharged from the pressure vessels to achieve a target ratio of the multiple fluid components. As such, techniques of this disclosure can help to ensure the accuracy of the mix ratio of the individual components that are provided to the dispensing device while decreasing the need for costly and time-consuming manual calibrations that may become inaccurate as temperature of the component materials or other system parameters change.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   at least one compressed gas source;
   a first pressure vessel pneumatically connected to the at least one compressed gas source and configured to discharge a first fluid component based on a first pressure of the first pressure vessel;
   a second pressure vessel pneumatically connected to the at least one compressed gas source and configured to discharge a second fluid component based on a second pressure of the second pressure vessel;
   a first pressure regulator pneumatically connected between the first pressure vessel and the at least one compressed gas source to regulate the first pressure of the first pressure vessel;
   a second pressure regulator pneumatically connected between the second pressure vessel and the at least one compressed gas source and manually adjustable to regulate the second pressure of the second pressure vessel;
   a third pressure regulator pneumatically connected between the first pressure regulator and the at least one compressed gas source and manually adjustable to regulate a pressure of compressed gas delivered to the first pressure regulator;
   a first flow meter configured to sense a first volumetric flow rate of the first fluid component discharged from the first pressure vessel;
   a second flow meter configured to sense a second volumetric flow rate of the second fluid component discharged from the second pressure vessel;
   a device for receiving the first fluid component and the second fluid component; and
   a controller connected to receive the sensed first volumetric flow rate from the first flow meter and the sensed second volumetric flow rate from the second flow meter, the controller configured to control the first pressure regulator based on the sensed first volumetric flow rate and the sensed second volumetric flow rate to produce a target ratio of the first fluid component and the second fluid component at the device.

2. The system of claim 1,
   wherein the device for receiving comprises a mixer.

3. The system of claim 1,
   wherein the first fluid component comprises a catalyst component and the second fluid component comprises a base component.

4. The system of claim 1,
   wherein the first pressure regulator is a voltage-to-pressure converter.

5. The system of claim 1,
   wherein the controller is configured to control the first pressure regulator to:
   increase the first pressure of the first pressure vessel in response to determining that a ratio of the sensed first volumetric flow rate to the sensed second volumetric flow rate is less than the target ratio; and
   decrease the first pressure of the first pressure vessel in response to determining that a ratio of the sensed first volumetric flow rate to the sensed second volumetric flow rate is greater than the target ratio.

6. The system of claim 1, further comprising:
   a fourth pressure regulator pneumatically connected between the second pressure vessel and the at least one compressed gas source to regulate the second pressure of the second pressure vessel.

7. The system of claim 1,
   wherein each of the first flow meter and the second flow meter are positive displacement meters.

8. The system of claim 1, further comprising:
   a speaker device remote from and operatively connected to the controller;
   wherein the controller is configured to cause the speaker device to output an audible alarm in response to determining that a ratio of the sensed first volumetric flow rate to the sensed second volumetric flow rate differs from the target ratio.

9. The system of claim 1, further comprising:
   a speaker device remote from and operatively connected to the controller;
   wherein the controller is configured to:
   determine a remaining volume of the first fluid component within the first pressure vessel based on the sensed first volumetric flow rate;
   determine a remaining volume of the second fluid component within the second pressure vessel based on the sensed second volumetric flow rate; and
   cause the speaker device to output an audible alarm in response to determining that either of the remaining volume of the first fluid component within the first pressure vessel or the remaining volume of the second fluid component within the second pressure vessel is less than a threshold volume.

10. The system of claim 1, wherein the controller comprises a user interface configured to receive user input defining the target ratio.

11. A system comprising:
at least one compressed gas source;
a first pressure vessel pneumatically connected to the at least one compressed gas source and configured to discharge a first fluid component based on a first pressure of the first pressure vessel;
a second pressure vessel pneumatically connected to the at least one compressed gas source and configured to discharge a second fluid component based on a second pressure of the second pressure vessel;
a first pressure regulator pneumatically connected between the first pressure vessel and the at least one compressed gas source to regulate the first pressure of the first pressure vessel;
a second pressure regulator pneumatically connected between the second pressure vessel and the at least one compressed gas source and manually adjustable to regulate the second pressure of the second pressure vessel;
a third pressure regulator pneumatically connected between the first pressure regulator and the at least one compressed gas source and manually adjustable to regulate a pressure of compressed gas delivered to the first pressure regulator;
a first flow meter configured to sense a first volumetric flow rate of the first fluid component discharged from the first pressure vessel;
a second flow meter configured to sense a second volumetric flow rate of the second fluid component discharged from the second pressure vessel;
a mixing device for receiving the first fluid component and the second fluid component and delivering mixed fluid based on a target mix ratio of the first fluid component and the second fluid component; and
a controller connected to receive the sensed first volumetric flow rate from the first flow meter and the sensed second volumetric flow rate from the second flow meter, the controller configured to control the first pressure regulator based on the sensed first volumetric flow rate and the sensed second volumetric flow rate so that the first volumetric flow rate is scaled to the sensed second volumetric flow rate to produce the target mix ratio.

12. The system of claim 11, wherein the first fluid component comprises a catalyst component and the second fluid component comprises a base component.

13. The system of claim 11, wherein the first pressure regulator is a voltage-to-pressure converter.

14. The system of claim 11, wherein the controller is configured to control the first pressure regulator to:
increase the first pressure of the first pressure vessel in response to determining that a ratio of the sensed first volumetric flow rate to the sensed second volumetric flow rate is less than the target ratio; and
decrease the first pressure of the first pressure vessel in response to determining that a ratio of the sensed first volumetric flow rate to the sensed second volumetric flow rate is greater than the target ratio.

15. The system of claim 11, further comprising
a speaker device remote from and operatively connected to the controller;
wherein the controller is configured to cause the speaker device to output an audible alarm in response to one or more of:
determining that a ratio of the sensed first volumetric flow rate to the sensed second volumetric flow rate differs from the target ratio;
determining that a remaining volume of the first fluid component within the first pressure vessel is less than a first threshold volume; and
determining that a remaining volume of the second fluid component within the second pressure vessel is less than a second threshold volume.

16. The system of claim 15, wherein the controller is configured to determine the remaining volume of the first fluid component within the first pressure vessel based on the sensed first volumetric flow rate; and
wherein the controller is configured to determine the remaining volume of the second fluid component within the second pressure vessel based on the sensed second volumetric flow rate.

17. The system of claim 15, wherein the first threshold volume and the second threshold volume are a same threshold volume.

18. A method comprising:
measuring, by a first flow meter, a first volumetric flow rate of a first fluid component discharged from a first pressure vessel;
measuring, by a second flow meter, a second volumetric flow rate of a second fluid component discharged from a second pressure vessel;
receiving, at a controller device, an indication of the first measured volumetric flow rate from the first flow meter and an indication of the second measured volumetric flow rate from the second flow meter;
controlling, by the controller device, a first pressure regulator pneumatically connected to the first pressure vessel to regulate a pressure of the first pressure vessel to produce a target ratio of the first fluid component and the second fluid component at a device;
manually adjusting a second pressure regulator that is pneumatically connected to the second pressure vessel to regulate a second pressure of the second pressure vessel; and
manually adjusting a third pressure regulator that is pneumatically connected between the first pressure regulator and the at least one compressed gas source.

* * * * *